(12) United States Patent
Olson

(10) Patent No.: US 7,321,946 B2
(45) Date of Patent: Jan. 22, 2008

(54) LINK EXTENDER HAVING EQUALIZATION CIRCUITRY

(75) Inventor: Jorell A. Olson, Portland, OR (US)

(73) Assignee: InFocus Corporation, Wilsonville, OR (US)

( * ) Notice: Subject to any disclaimer, the term of this patent is extended or adjusted under 35 U.S.C. 154(b) by 42 days.

(21) Appl. No.: 11/084,467

(22) Filed: Mar. 18, 2005

(65) Prior Publication Data
US 2006/0010274 A1 Jan. 12, 2006

Related U.S. Application Data

(60) Provisional application No. 60/586,397, filed on Jul. 7, 2004.

(51) Int. Cl.
G06F 13/00 (2006.01)
(52) U.S. Cl. .................. 710/300; 710/64; 710/69; 710/72; 710/313
(58) Field of Classification Search ........ 710/300–317, 710/60–72; 174/113 R; 330/304, 250
See application file for complete search history.

(56) References Cited

U.S. PATENT DOCUMENTS

| | | | |
|---|---|---|---|
| 6,501,792 B2 | 12/2002 | Webster | |
| 6,738,344 B1 | 5/2004 | Bunton et al. | |
| 6,790,094 B1* | 9/2004 | Bergmann et al. | 439/653 |
| 6,838,943 B2* | 1/2005 | Zamir et al. | 330/304 |
| 6,941,395 B1* | 9/2005 | Galang et al. | 710/65 |
| 7,065,604 B2* | 6/2006 | Konda et al. | 710/315 |
| 2004/0015991 A1* | 1/2004 | Thornton | 725/74 |
| 2004/0049592 A1* | 3/2004 | Yurusov | 709/231 |
| 2006/0008276 A1* | 1/2006 | Sakai et al. | 398/141 |
| 2006/0010291 A1* | 1/2006 | Olson | 711/115 |

FOREIGN PATENT DOCUMENTS

WO  WO 03/079623 A  9/2003

OTHER PUBLICATIONS

GS8000 DVI/HDMI Extender Data Sheet, XP-002356842, Gennum Corp., May 2005, www.gennum.com.
Infocus Projector Setup Guide for a Macintosh Laptop, XP-002356843, Copyright 1999-2005, InFocus Corporation.
"GS8000 DVI Extender," Advance Information Note, Gennum Ciorporation, Mar. 2003, 11 pgs.
"Cable Equalizer IC Extends DVI/HDMI Reach Beyond 30 Meters," Press Information, Maxi Integrated Products, Oct. 22, 2004, 1 pg.

* cited by examiner

Primary Examiner—Raymond N Phan
(74) Attorney, Agent, or Firm—Schwabe, Williamson & Wyatt

(57) ABSTRACT

An apparatus comprises a first plug to couple the apparatus to a host connection and a second plug to couple the apparatus to a display connection. The apparatus further comprises a metallic transmission medium coupled to the first plug and link extender circuitry coupled to the metallic transmission medium and the second plug. The link extender circuitry including equalization circuitry coupled to the metallic transmission medium to restore voltage levels on signals transmitted on the metallic transmission medium, differential signaling receive circuitry coupled to the equalization circuitry; and differential signaling transmit circuitry coupled to the differential signaling receive circuitry and the second plug.

17 Claims, 6 Drawing Sheets

LINK EXTENDER HAVING EQUALIZATION CIRCUITRY

RELATED APPLICATION

This application claims priority to U.S. Provisional Application No. 60/586,397, entitled Link Extender filed Jul. 7, 2004, hereby fully incorporated by reference.

TECHNICAL FIELD

The present invention relates to the field of electronic display devices, and, in particular, cabling for electronic display device connectivity.

BACKGROUND

Interfaces between host equipment and display devices are numerous. The Digital Visual Interface (DVI) standard, for example, specifies a specific interface, including a connector, which allows display devices and host devices to communicate. This standard provides for, among other things, the transmission of data via a transition minimized differential signal (TMDS) interface. The TMDS interface provides for digital transmission of data at higher frequencies than older analog interfaces. Nevertheless, an analog interface is provided by the standard as well.

A more "display friendly" interface standard, the M-1 interface standard, was proposed by the Video Electronics Standards Association (VESA). Like the DVI standard, the M-1 standard interface provides both analog and digital connections. The digital interface also uses a TMDS interface. Yet another standard providing for an interface between host equipment and display devices is the High-Definition Multimedia Interface (HDMI).

BRIEF DESCRIPTION OF DRAWINGS

Embodiments of the present invention will be described referencing the accompanying drawings in which like references denote similar elements, and in which.

DETAILED DESCRIPTION

In the following detailed description, a novel apparatus for connecting to a display device is disclosed. In this description, mention is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

The phrase display device, as used herein, is meant to include a device capable of displaying images. Thus, the phrase display device is meant to include, but is not limited to, projectors, liquid crystal displays, cathode ray tube displays, and plasma displays.

Figure 1:
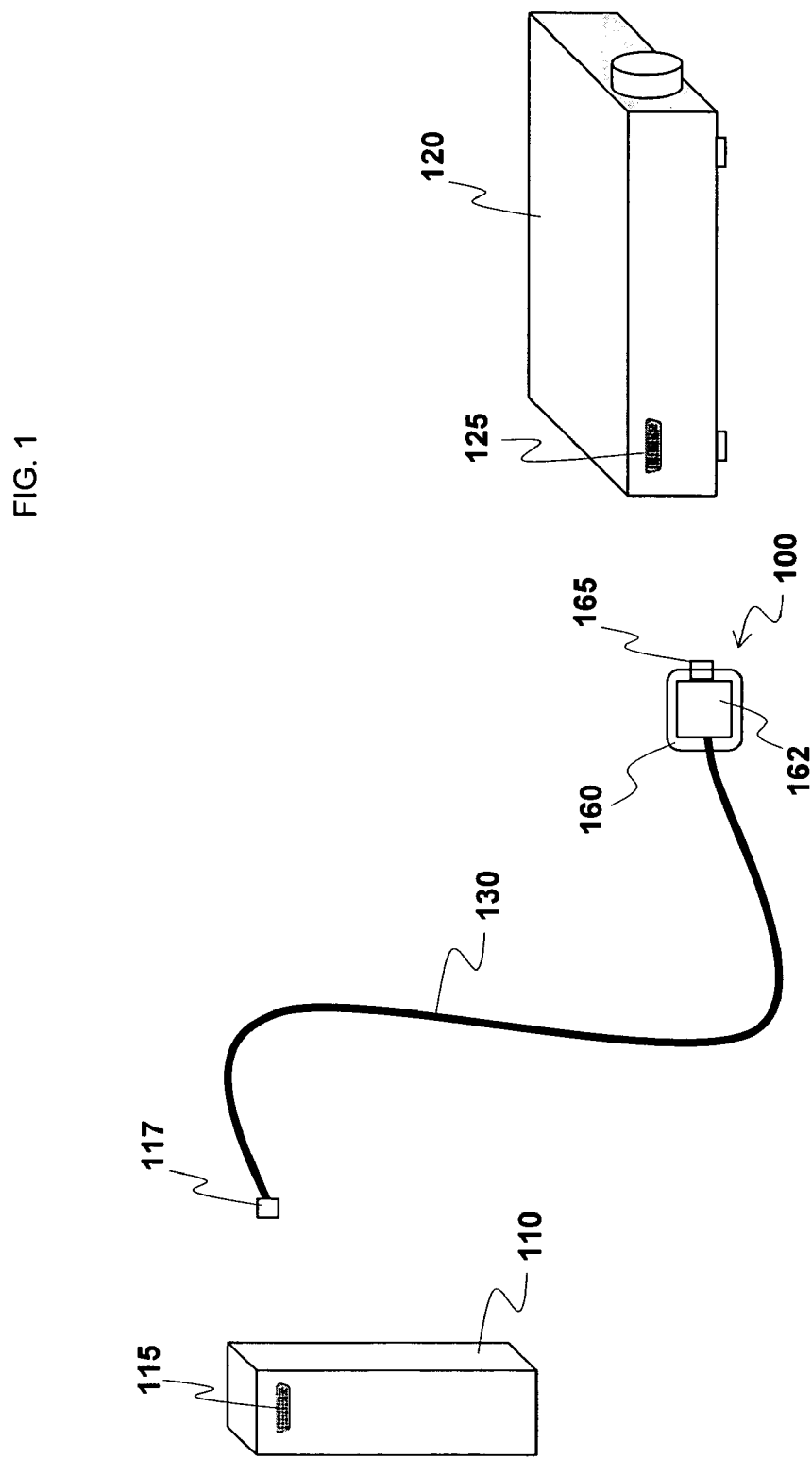
FIG. 1 illustrates a link extender facilitating connectivity between a host device and a display device via metallic interface in accordance with one embodiment.

FIG. 1 illustrates a link extender 100 facilitating connectivity between a host device 110 and a display device 120 via metallic interface 130 in accordance with one embodiment. The link extender 100 can be utilized to allow a host device 110 driving a display device 120 to be located at a greater distance than would otherwise be available using metallic-based connectors. For example, currently the maximum length for a metallic cable carrying a signal via a DVI or HDMI interface is approximately 5 meters. As illustrated in FIG. 1, link extender 100 allows metallic interfaces 130 of lengths up to, for example, 30 meters to be utilized in connecting a host device 110, via the DVI or HDMI port 115 of the host device 110 and an interface 117, e.g., a plug or a receptacle, to a display device 120 via the M1-DA receptacle 125 of the display device 120. In the embodiment illustrated, the link extender 100 comprises an overmolded housing 160 containing link extender circuit 162. The overmolded housing 160 may be coupled to an M1-A plug 165 which is also coupled to the link extender circuit 162. The M1-A plug 165 is capable of coupling to the M1-DA receptacle 125. While the embodiments described herein are described with respect to plugs, it is understood that receptacles may also be used. This may be the case where a cable with the link extender may be less than a maximum length and the cable with the link extender may be utilized with other cables not utilizing a link extender.

Figure 2:
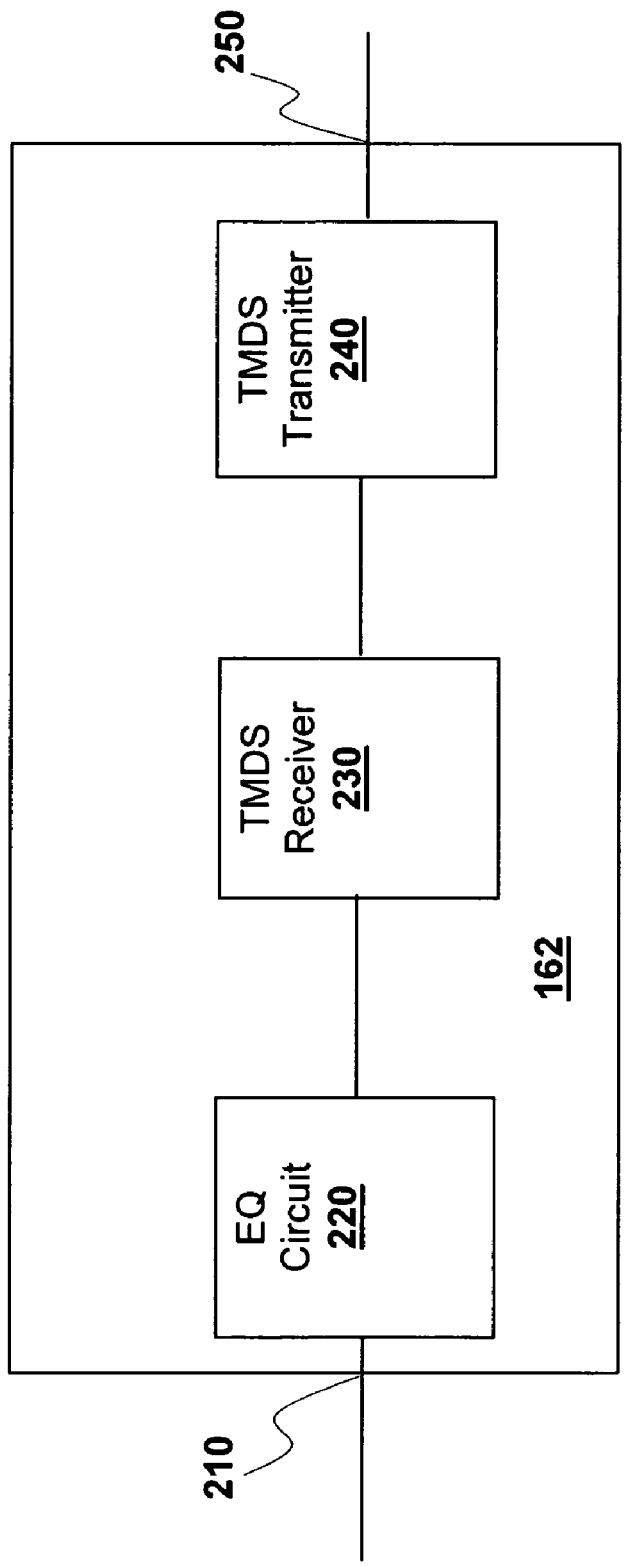
FIG. 2 illustrates link extender circuit in accordance with one embodiment.

FIG. 2 illustrates link extender circuit 162, in accordance with one embodiment. The link extender circuit 162 comprises an interface to couple the link extender circuit 162 to a metallic transmission medium 210 as illustrated in FIG. 1. The link extender circuit 162 also comprises equalization circuitry 220 coupled to the interface to restore voltage levels on signals transmitted on the metallic transmission medium 210. The metallic transmission medium 210 may include metal conductors capable of carrying differential signals, such as transition minimized differential signals (TMDS). The equalization circuitry 220 may provide voltage restored signals to a receiver circuit 230, which for the embodiment may be a TDMS receiver circuit. An example of equalization circuitry 220 is the GS8000 from Gennum Corporation. The (TMDS) receiver circuit 230 provides outputs that may be provided to a differential signal transmitter circuit 240, which for the embodiment may be a TDMS transmitter circuit. The output of the (TMDS) transmitter circuit 240 may be coupled to an interface 250 that may be coupled to an M1 plug, such as an M1-A or M1-D plug. The combination of the (TMDS) receiver circuit 230 and the (TMDS) transmitter circuit 240 may operate on the voltage restored signals of the equalization circuit 220 to provide re-timed signals for output to the M1 plug. Examples of TMDS receiver circuit 230 and the TMDS transmitter circuit 240 are the TFP401 TMDS receiver and the TFP410 TMDS transmitter, respectively, both from Texas Instruments.

Figure 3:
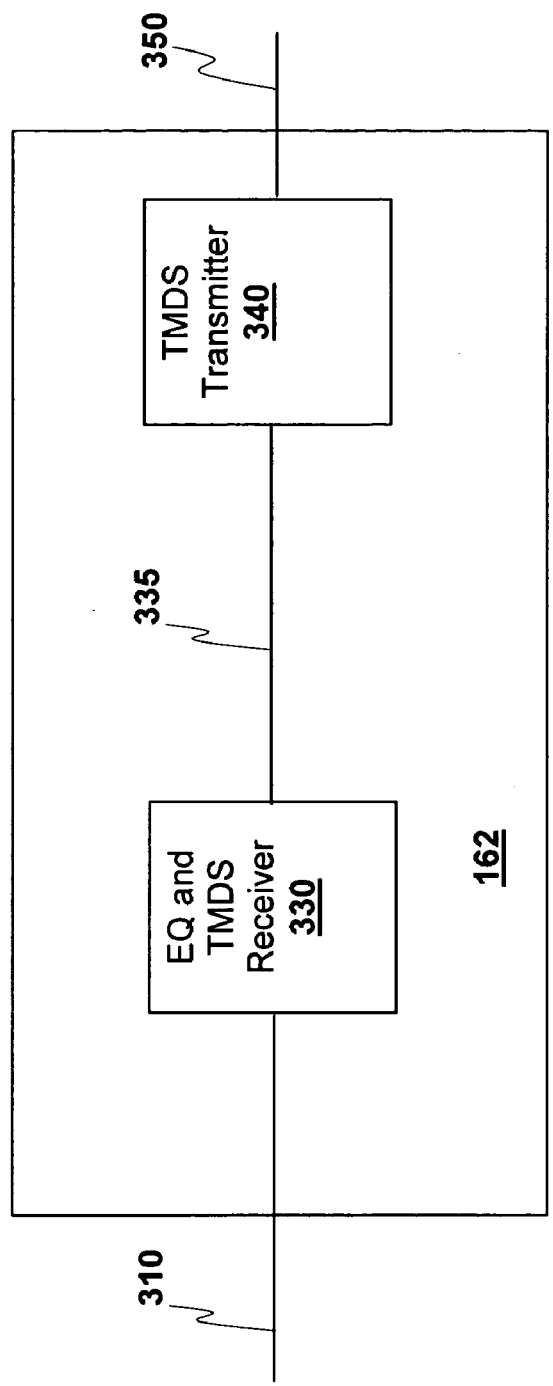
FIG. 3 illustrates a link extender circuit in accordance with another embodiment.

FIG. 3 illustrates link extender circuit 162 in accordance with another embodiment. In the embodiment illustrated, an interface to the metallic transmission medium 310 and an interface 350 to a plug may exist as discussed in association with FIG. 2. In the embodiment illustrated, equalization circuitry and TMDS receive circuits are both combined into a single device 330. For example, the equalization function and TMDS circuits may both be provided in a GS 8001 device by Gennum Corporation. In one embodiment, pixel data output and control signals 335 that are output by the device 330 may be provided to a TMDS compatible transmitter 340 such as the THC63DV154 from Thine Electronics, Inc. The TMDS compatible transmitter 340 may provide TMDS data via interface 350 to an output plug for coupling to a display device.

The previous embodiments illustrate the use of link extender in conjunction with a metallic cable coupled to DVI/HDMI/M1 connectors. In certain environments, especially where existing cabling has been installed, it may be desirable to create link extenders which interface with metallic cabling through other interfaces.

Figure 4:
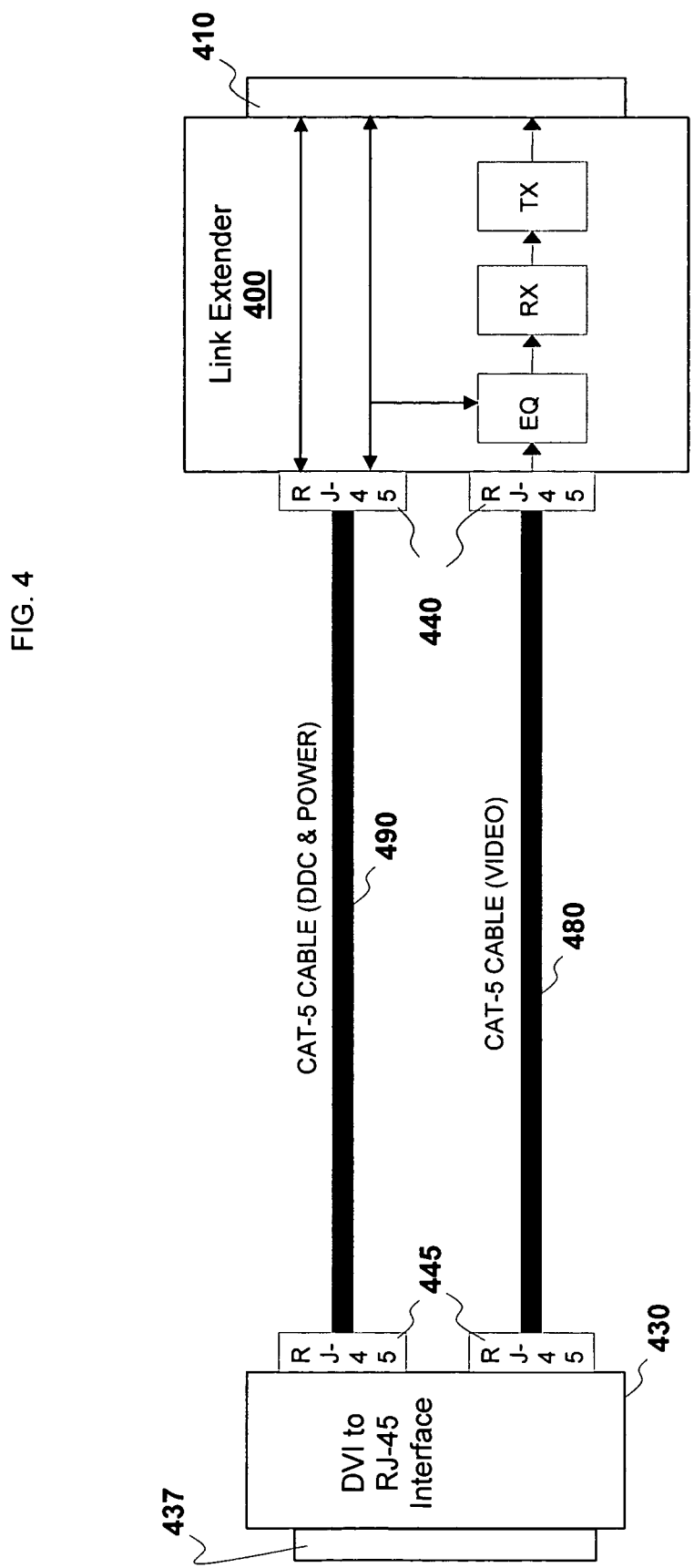
FIG. 4 illustrates a link extender for use with two cables in accordance with another embodiment.

FIG. 4 illustrates a link extender for use with two cables in accordance with another embodiment. In the embodiment illustrated, two cables 480 and 490 are utilized to provide DVI signals that would otherwise be provided over a single DVI cable. A DVI interface typically includes video and/or audio data that is provided via a TMDS link, power, Hot Plug Detect (HPD) and Display Data Channel (DDC) information. On the TMDS link there are 3 sets of differential pairs that carry the video and/or audio data signals and a fourth set of differential pairs that carry the clock signal. The DDC comprises a DDC data signal and a DDC clock signal.

In one embodiment, each of the cables comprises four twisted pairs and is interfaced via Register Jack-45 (RJ-45) adapters. Examples of such cables include CAT-5 cabling capable of carrying data at rates of, for example, 100 Mbits per second. On a first cable 480, the TMDS link is provided by utilizing the four twisted pairs to provide the signals of the DVI comprising the TMDS link (e.g., three pairs of differential data and one pair of differential clock). On a second cable 490, the other portions of the DVI link such as the DDC and HPD are provided. As discussed below, when an M1 interface is utilized, power may also be provided.

On the host side of the two cables, a connector may be provided which has two receptacles to receive two RJ-45 plugs 445. The connector may also have a DVI plug 437. The connector may also contain an interface 430 to facilitate the mapping of the pins from the DVI plug 437 to the appropriate connections in the RJ-45 plugs 445. On the display device side of the two cables, a link extender 400 provides an interface between, for example, an M1-D plug 410 and two RJ-45 plugs 440.

Figure 5:
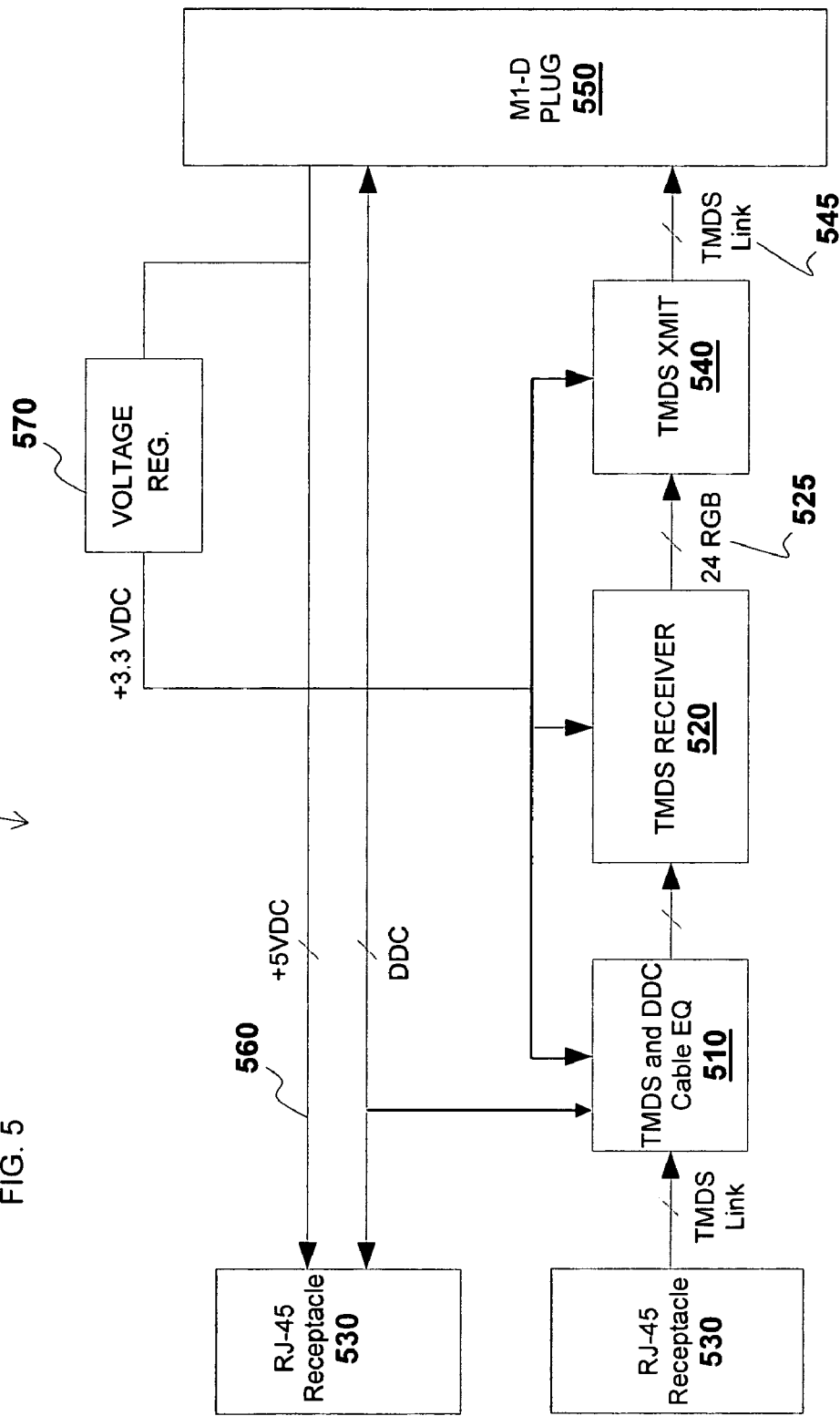
FIG. 5 illustrates the components of a link extender in accordance with one embodiment.

FIG. 5 illustrates the components of the link extender 400 in accordance with one embodiment. The link extender 400 may receive DVI signals from a host device via receptacles 530. Equalizer circuit 510 may be utilized to restore TMDS signals received via receptacles 530 to DVI compliant levels. The restored TMDS signals may be received by a TMDS receiver 520. The TMDS receiver 520 may provide 24-bit RGB data 525 to a TMDS transmitter 540. The data and clock signals on the TMDS link 545 from the TMDS transmitter 540 may be restored signals that have had the appropriate voltage levels restored as well as having been properly re-timed. These clock and data signals on the TMDS link 545 may then be provided to an M1-D plug 550 for provision to a display device.

In addition to restoring the TMDS signals, the equalizer circuit 510 may be utilized to manage DDC traffic in both directions. This may be facilitated by restoring incoming signals to appropriate DDC levels. It may also be facilitated by boosting outgoing signals as, for example, may be required for the DDC signals to be utilized on an Inter-IC ($I^2C$) bus.

The M1 specification calls for a five volt direct current supply voltage to be available. Thus, the M1-D plug 550 may have available to it a +5 VDC signal 560. This signal may be utilized to provide voltages to operate devices of the link extender 400. For example, a voltage regulator 570, as part of the link extender 400, may provide a 3.3 VDC signal for use in powering equalizer 510 and TMDS receiver 520 and transmitter 540.

Figure 6:
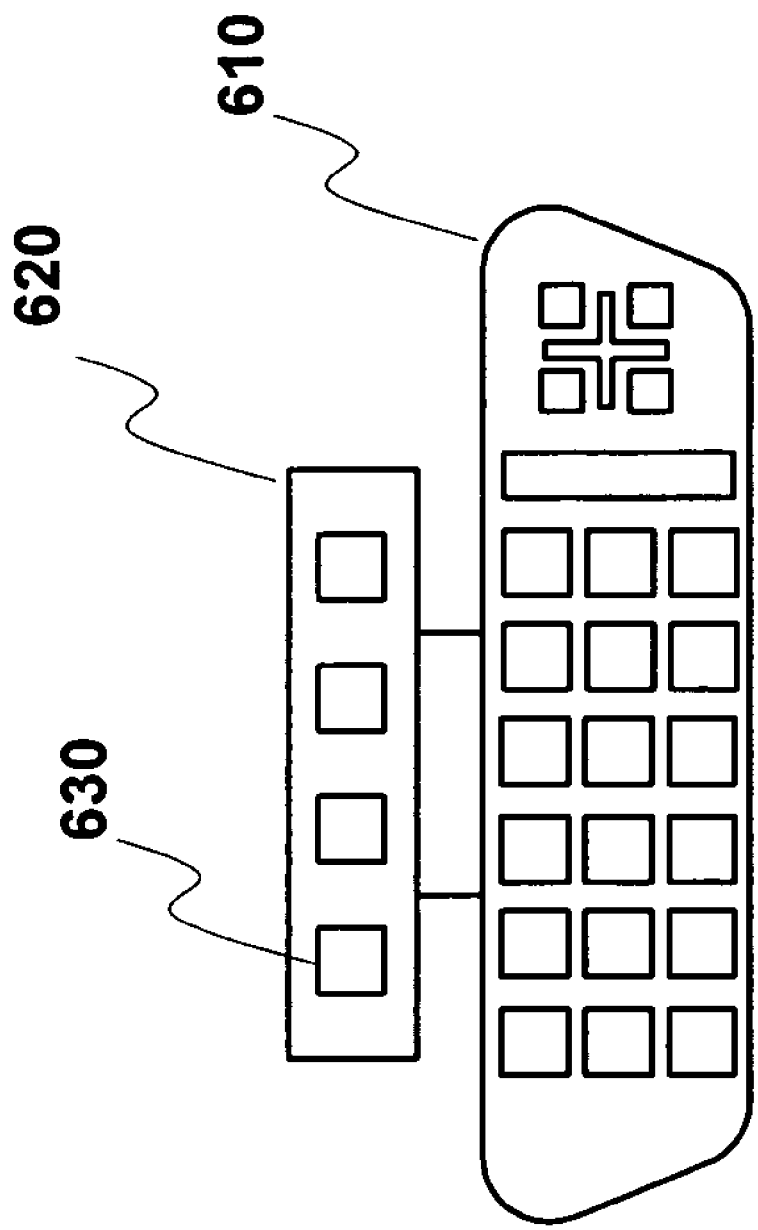
FIG. 6 illustrates a view of a connector for use with a link extender, in accordance with one embodiment.

The above embodiments have been illustrated with an M1 connector providing connectivity to a display device. As discussed above, these embodiments may have available to them a voltage supply to provide power to operate the circuitry of the link extender. In alternatively embodiments, a DVI connector may be utilized. In such an embodiment, power may not be available to power the link extender as described above in accordance with FIG. 5. FIG. 6 illustrates a view of a connector for use with a link extender, in accordance with another embodiment. The connector comprises a DVI plug 610 that provides DVI signals including DDC and a TMDS link. This connector has coupled to the DVI plug 610 an additional plug 620. This additional plug may contain one or more pins 630 to provide power for use by the link extender. In one embodiment, the one or more pins 630 provides voltage that may be utilized by the electronics of the link extender. In another embodiment, the one or more pins 630 provide voltages that are converted by a DC/DC converter in the link extender. Such a connector may be utilized in lieu of an M1 connector where appropriate.

For example, in one embodiment two TMDS links may be utilized via a DVI cable. In this case, a DVI receptacle is utilized on the display device with an additional receptacle capable to provide power, as illustrated in FIG. 6. In such an embodiment, multiple equalizer circuits and TMDS receiver and transmitter circuits may be utilized. There may be one equalizer circuit and one TMDS receiver and transmitter for each TMDS link.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus comprising:
    a receptacle to couple the apparatus to a host connection;
    a plug to couple the apparatus to a display connection;
    link extender circuitry coupled to the receptacle and the plug, the link extender circuitry including:
    equalization circuitry coupled to the receptacle to restore voltage levels on signals received from the host connection at the receptacle;
    differential signaling receive circuitry coupled to the equalization circuitry; and differential signaling transmit circuitry coupled to and located between the differential signaling receive circuitry and the plug.

2. The apparatus of claim 1 wherein the plug comprises an M1-D plug.

3. The apparatus of claim 1 wherein the receptacle comprises an M1-DA receptacle.

4. The apparatus of claim 1 wherein the equalization circuitry is adapted to dynamically restore voltage levels based at least in part on the signals received from the host connection.

5. The apparatus of claim 1 wherein the differential signal receive circuitry comprises a transition minimized differential signal (TDMS) receive circuitry, and the equalization circuitry and the TMDS receiver circuitry comprises a Gennum GS8000 DVI extender.

6. The apparatus of claim 1 wherein the receptacle comprises a plurality of Register Jack-45 (RJ-45) receptacles.

7. An apparatus comprising:
a first plug to couple the apparatus to a host connection;
a second plug to couple the apparatus to a display connection;
a metallic transmission medium coupled to the first plug; and
link extender circuitry coupled to the metallic transmission medium and the second plug, the link extender circuitry including:
equalization circuitry coupled to the metallic transmission medium to restore voltage levels on signals transmitted on the metallic transmission medium;
differential signaling receive circuitry coupled to the equalization circuitry; and
differential signaling transmit circuitry coupled to and located between the differential signaling receive circuitry and the second plug.

8. The apparatus of claim 7 wherein the second plug comprises an M1-D plug.

9. The apparatus of claim 7 wherein the link extender circuitry further comprises a direct current to direct current converter coupled to a voltage supply pin of the M1-D plug.

10. The apparatus of claim 7 wherein the equalization circuitry is adapted to dynamically restore voltage levels based at least in part on the signals received from the host connection.

11. The apparatus of claim 7 wherein the equalization circuitry and the TMDS receiver circuitry comprises a Gennum GS8000 DVI extender.

12. The apparatus of claim 7 wherein the metallic transmission medium comprises a plurality of metallic traces capable of carry signals compatible with the Digital Visual Interface (DVI) standard.

13. The apparatus of claim 7 wherein the metallic transmission medium comprises a plurality of metallic traces capable of carry signals compatible with the High-Definition Multimedia Interface (HDMI) standard.

14. The apparatus of claim 7 wherein the metallic transmission medium comprises two pluralities of metallic traces correspondingly coupled to two Register Jack-45 (RJ-45) plugs.

15. The apparatus of claim 7 wherein the differential signal receive circuitry comprises a transition minimized differential signal receive circuitry, and the differential signal transmit circuitry comprises a transition minimized differential signal transmit circuitry.

16. The apparatus of claim 1 wherein the differential signaling receive circuitry and the differential signaling transmit circuitry operate on voltage restored signals from the equalization circuitry.

17. The apparatus of claim 7 wherein the differential signaling receive circuitry and the differential signaling transmit circuitry operate on voltage restored signals from the equalization circuitry.

* * * * *